United States Patent [19]

Exner et al.

[11] 4,202,745
[45] May 13, 1980

[54] METHOD FOR TREATING A DESIZING WASTE STREAM

[75] Inventors: Jurgen H. Exner; Cyril B. Henke, both of Knoxville, Tenn.

[73] Assignee: The Dow Chemical Company, Midland, Mich.

[21] Appl. No.: 922,925

[22] Filed: Jul. 7, 1978

[51] Int. Cl.$^2$ ............................ C02B 1/20; C02C 5/02
[52] U.S. Cl. ..................................... 204/180 R; 8/138; 210/49; 210/56; 210/22 D
[58] Field of Search ............... 8/138; 204/151, 180 R, 204/180 P; 210/22 R, 22 D, 42 R, 45, 49, 51–53, 56

[56] References Cited

U.S. PATENT DOCUMENTS

| | | | |
|---|---|---|---|
| 3,960,485 | 6/1976 | Fantl et al. | 210/51 |
| 3,986,951 | 10/1976 | Fremont | 204/180 P |
| 4,066,541 | 1/1978 | Sando et al. | 210/53 |
| 4,106,900 | 8/1978 | Perkins | 8/138 |

FOREIGN PATENT DOCUMENTS

| | | | |
|---|---|---|---|
| 5128355 | 9/1974 | Japan | 210/51 |
| 5198156 | 2/1975 | Japan | 210/52 |

OTHER PUBLICATIONS

King, *Separation Processes*, McGraw Hill, 1971, pp. 26–31.
"Elvanol Polyvinyl Alcohols", (DuPont), 1947.

*Primary Examiner*—Charles N. Hart
*Assistant Examiner*—Peter A. Hruskoci

[57] ABSTRACT

A dispersed synthetic polymeric organic size is efficiently recovered as a material of low salt content from an aqueous desizing waste stream by combining the stream with a solution of an inoganic salt under high shear mixing conditions to a final salt concentration greater than about four percent, thereby precipitating the dispersed polymeric size. The aqueous phase remaining can be subjected to electrodialysis to produce a concentrated salt brine and an aqueous solution low in salt content.

5 Claims, No Drawings ature in the range of about ambient room temperature to about 80° C.

METHOD FOR TREATING A DESIZING WASTE STREAM

BACKGROUND OF THE INVENTION

The present invention relates to a method for treating an aqueous waste to remove dispersed and dissolved solids. It relates particularly to a treatment of aqueous waste from a textile desizing operation which permits recovery of a desired polymeric size as a reusable material.

In the textile industry, water-dispersible sizing agents such as polyvinyl alcohol, starch, carboxymethylcellulose, other polymeric materials and their mixtures are coated on fibers to protect them during weaving or knitting and to improve processing operations. These sizes are later removed by hot water treatment and the dilute aqueous waste streams thereby produced are discharged to waste treatment systems or directly to the environment. When a synthetic organic polymeric size such as polyvinyl alcohol (PVA), carboxymethylcellulose (CMC), or other such material is involved, the cost of the size as well as increasing restrictions against pollution of the environment makes necessary some kind of treatment of the aqueous waste stream, not only to remove the dispersed size to as great an extent as practical, but also to recover it as a reusable material.

Ultrafiltration has been used to recover PVA from such wastes but this process yields a concentrate containing only about 8–10 percent PVA and the process is not applicable to commonly used mixtures of PVA with starch. It is known that PVA and other such polymers can be precipitated from their water dispersions by dissolved inorganic salts such as $Na_2SO_4$ but the precipitated materials contain large quantities of occluded and adsorbed salt and are not readily purifiable to a reusable quality. Also, a precipitation process of this kind involves the use of large quantities of the precipitating salt. Even a very cheap salt could not simply be discharged as waste from the process, but would have to be recovered for reuse because of both economic considerations and the impracticality of dumping large amounts of water-soluble salt which would eventually reach water supplies.

SUMMARY OF THE INVENTION

It has now been found that a synthetic organic polymeric size can be recovered efficiently from a dilute aqueous waste stream as a material of reusable quality by a process which comprises combining the waste stream with an aqueous solution of a nonoxidizing inorganic salt under conditions of high shear mixing to an average concentration of about 7–14 percent by weight of the salt and a final salt concentration at least about 4 percent at about ambient room temperature to about 80° C., thereby precipitating the major portion of the polymeric size as a material containing a relatively low concentration of agglomerated salt and separating the precipitated size from the mixture. After separation of the precipitate, the remaining aqueous phase is subjected to electrodialysis to produce a concentrated brine rich in salt and a water solution low in salt content.

DETAILED DESCRIPTION OF THE INVENTION

Under the conditions as outlined, better than 80 percent of the synthetic polymeric size can be recovered as a material containing less than 20 percent by weight of salt and 90 percent or more of the salt used in the precipitation can be recovered and recycled to the process. Under preferred conditions, over 90 percent of the size is recovered as a product having a salt content of about 10 percent or less. An additional advantage of the process is that less than 10 percent of the organic impurities originally present in the waste size solution are found in the precipitated size.

This process is particularly applicable to the recovery of polyvinyl alcohol from sizing operations using polyvinyl alcohol alone or mixed with starch. The process is also useful for the recovery of other synthetic polymeric sizes such as carboxymethylcellulose and water-dispersible polyester-based sizes such as Eastman WD size.

Preferably, the precipitation process is carried out using an average salt concentration of about 9–12 percent whereby polymer recoveries of about 95 percent are obtainable and the salt content of the recovered polymer approximates 10 percent. Precipitation of size outside the preferred limits of salt concentration results in somewhat increased salt content in the precipitate and outside the process limits of 7 to 14 percent salt concentration, the content of agglomerated salt in the precipitated size becomes unacceptably high. Preferred precipitation and separation temperatures are in the range of about 50° C.–75° C.

Sodium sulfate ($Na_2SO_4$) is the salt preferred for use in the process but other similarly water-soluble nonoxidizing salts are also useful. Examples of these include $K_2SO_4$, $(NH_4)_2SO_4$, $Na_2CO_3$ and $K_2CO_3$. Mixtures of two or more such salts can also be employed.

The average salt concentration during the precipitation process is arbitrarily defined herein as the numerical average of the concentration of the salt solution and the salt concentration in the final mixture of salt solution and waste stream. It has been found that the value so determined provides an accurate index of polymer recovery and salt content of the recovered polymer size independent of the relative volumes of salt solution and desizing waste solution used or the way in which these solutions are combined.

The salt solution and the waste size solution can be combined in any convenient way, that is, the salt solution can be added to the waste solution, the waste solution can be added to the salt solution, or the two solutions can be run together in a continuous mixing process. Similarly, the relative volumes of the two solutions can vary widely so long as the average and final concentration limits defined above are observed. In any order of combining the two solutions, a critical feature in determining the quality of recovered polymeric size is the efficiency of agitation for rapid, thorough mixing to minimize occlusion of salt in the precipitated particles of size. This requires the use of one or more high speed agitators to provide high shear mixing, high speed for the purpose of this process being defined as at least about 1000 rpm.

The precipitated polymeric size can be separated from the combined salt and waste solutions by any appropriate method. Filtration is effective and the precipitated material is also readily separated in a settling tank by skimming the lighter size from the surface of the diluted salt solution.

The electrodialysis step can provide nearly the theoretical recovery of salt. The concentration achieved is determined by the percent recovery desired and by the size and sophistication of the equipment. Electrodialysis can be carried out from about 20° C. up to about 100° C., preferably at about 45° C.–75° C. Generally, the electrodialysis step is carried out at as high a temperature as is compatible with stability of the dialysis membrane and with other process parameters so as to take advantage of the normally higher solubility and conductivity of the salt at the higher temperatures and to produce a more concentrated brine. In the recovery of the salt by electrodialysis, a key advantage is the ability to separate organic impurities such as oil, waxes, and surfactants. Most of these impurities remain in the discarded dilute salt stream with no more than about 10 percent remaining in the recycled concentrated brine. In this way, these impurties are purged from the system and do not accumulate.

In a preferred commercial scale embodiment of the process, a desizing waste stream containing about 1.4 percent PVA is combined at 2.5 liters/min. at about 80° C. with 3.4 liters/min. of 10 percent $Na_2SO_4$ solution at 50° C. using an in-line high shear agitator for one minute mixing time. The resulting mixture passes to a settling tank equipped with a skimmer whereby the top layer of precipitated PVA is recovered and redissolved in water for recycle to the sizing operation. The salt solution from the settling tank is transferred in part to electrodialysis equipment where it is converted at about 55° C. to a brine containing about 22 percent $Na_2SO_4$ and a very dilute $Na_2SO_4$ solution which is discarded. The brine is combined at about 0.76 liter/min with about 2.64 liters/min. of about 6 percent $Na_2SO_4$ solution from the settling tank to make up 10 percent $Na_2SO_4$ solution for recycle to the precipitation step. The recovered PVA is made up to a solution of about 10–16 percent concentration containing 1–2 percent $Na_2SO_4$.

EXPERIMENTAL PROCEDURE

Synthetic waste solutions were made up by dissolving one percent by weight polyvinyl alcohol (duPont Elvanol T-25) in water. This solution was added to an aqueous solution of $Na_2SO_4$ with high shear agitation (7,000–18,000 rpm) according to two methods. In Method B, a batch type process, an equal volume of polyvinyl alcohol (PVA) solution was added to the sodium sulfate solution over about 13 minutes with an additional 15 seconds of agitation after the addition was complete. Method C simulated a continuous process by adding one volume of PVA solution to 7 volumes of $Na_2SO_4$ solution over a two-minute period. A household blender was used for agitation in both Methods B and C. In comparative experiments to show the effect of low shear mixing, Method A consisted of adding an equal volume of PVA solution to the aqueous $Na_2SO_4$ over 30 minutes followed by 30 minutes of stirring with a low speed paddle stirrer. Precipitation was at about 20° C.–25° C. in all three methods.

After the final agitation in all three methods, the precipitated PVA was separated by filtration in a vacuum filter using standard laboratory filter paper. The collected precipitate was dried, weighed, and analyzed for PVA and $Na_2SO_4$ content. In order to separate the dissolved salt, the filtrate was run through a laboratory electrodialysis unit having 9 cell pairs with a total membrane area of 1.35 $dm^2$. The dialysis was run at a constant applied voltage of 0.6 volts per cell pair and a temperature of 45° C. About 90 percent of the $Na_2SO_4$ was found in the concentrate stream and the dilute stream was about 0.127 molar $Na_2SO_4$. Results of these experiments are listed in the following tables. The salt content of the recovered PVA and the percent recovery of PVA were found to correlate closely with the average $Na_2SO_4$ concentration during precipitation independent of the method of precipitation used so these average concentrations are listed in the results obtained.

EXAMPLES 1–17

Examples 1–5 are comparative runs included to show the poor quality of recovered PVA from precipitation by Method A using low shear agitation. In the other examples were precipitation was by Methods B and C, agitation was by a household blender operating at 13,000 rpm and conditions otherwise as listed above except as noted for specific examples.

| Example | Method | % $Na_2SO_4$ ave. conc. | % PVA Recovery | % $Na_2SO_4$ in Recovered PVA |
|---|---|---|---|---|
| 1 | A | 7.5 | 74 | 72 |
| 2 | A | 11.3 | 92 | 76 |
| 3 | A | 15.0 | 98 | 64 |
| 4 | A (PVA/Starch)* | 8.0 | 86 | 85 |
| 5 | A (PVA/Starch)* | 13.0 | 90 | 80 |
| 6 | B | 4.5 | 52 | 31 |
| 7 | B | 6.0 | 72 | 23 |
| 8 | B | 7.5 | 85 | 14 |
| 9 | B | 9.0 | 92 | 10 |
| 10 | B | 11.3 | 95 | 10 |
| 11 | B | 12.8 | 97 | 7 |
| 12 | C | 5.6 | 77 | 35 |
| 13 | C | 7.9 | 91 | 18 |
| 14 | C | 8.4 | 92 | 11 |
| 15 | C | 9.8 | 95 | 12 |
| 16 | C | 11.3 | 97 | 10 |
| 17 | C | 14.0 | 98 | 20 |

*The synthetic waste stream contained 0.75 percent PVA and 0.75 percent starch.

EXAMPLES 18–23

Experiments were run by Method B wherein the blender speed and the temperature of precipitation were varied. Higher temperature and higher blender speed within the ranges tested appeared to have little effect except for slightly lower salt content in the recovered PVA.

| Example | Precipitation Condition | % $Na_2SO_4$ ave. conc. | % PVA Recovery | % $Na_2SO_4$ in Recovered PVA |
|---|---|---|---|---|
| 18 | 7,000 rpm | 9.0 | 91 | 12 |
| 19 | 13,000 rpm | 9.0 | 91 | 11 |
| 20 | 18,000 rpm | 9.0 | 92 | 9 |
| 21 | temp = 25° C. | 9.0 | 92 | 10 |
| 22 | temp = 50° C. | 9.0 | 92 | 8 |
| 23 | temp = 65° C. | 9.0 | 93 | 7 |

EXAMPLES 24–25

Two actual waste streams from textile desizing processes were treated by Methods B and C. Stream 1 contained 1.4 percent PVA, 11 mg/l suspended solids, 14 mg/l total dissolved solids, and had pH 6.5. Stream 2 contained 2.6 percent PVA, 2 mg/l suspended solids, 30 mg/l total dissolved solids, and had pH 6.0.

| Example | Method | % Na$_2$SO$_4$ ave. conc. | % PVA Recovery | % Na$_2$SO$_4$ in Recovered PVA |
| --- | --- | --- | --- | --- |
| 24 | B (Stream 1) | 11.2 | 90 | 7 |
| 25 | C (Stream 2) | 8.4 | 92 | 7 |

Desizing waste streams such as those treated in Examples 24 and 25 typically contain about 2 percent organic impurities for example, oils, waxes, and surfactants, based on the weight of PVA. When these streams are treated by the present process, the recovered PVA contains only about 0.04–0.2 percent by weight of such impurities. The salt solution feed to the electrodialysis step from the size precipitation normally contains about 1.4 percent by weight of the organic impurities. Of these, about 90 percent passes into the dilute salt solution waste from the dialysis and so out of the process while the remaining 10 percent or so appears in the concentrated brine.

EXAMPLES 26–27

Two synthetic waste solutions were made up and treated with salt solution by continuous mixing, one containing 2 percent by weight Eastman WD size, a water-dispersible polyester-based material, and the other containing 1.1 percent PVA plus 1.6 percent starch. Results were as listed below.

| Example | Stream | % Na$_2$SO$_4$ ave. conc. | % Size Recovery | % Na$_2$SO$_4$ in Recovered Size |
| --- | --- | --- | --- | --- |
| 26 | WD Size | 6.6 | 98 | 4.4 |
| 27 | PVA-Starch | 6.7 | 82 (PVA) | 11.0 |

In the same way as described in the above examples, carboxymethylcellulose in a waste stream from a desizing operation involving use of that polymeric size is recovered by precipitation in a sodium sulfate solution as a material suitable for reuse as a textile size. Similarly, other salts such as K$_2$SO$_4$, (NH$_4$)$_2$SO$_4$, Na$_2$CO$_3$, and K$_2$CO$_3$ are substituted for the Na$_2$SO$_4$ in the examples to produce comparable results in recovery and purity of recovered size.

We claim:

1. A method for treating an aqueous desizing waste stream containing dispersed polyvinyl alcohol which consists essentially of combining said stream with an aqueous nonoxidizing salt solution wherein the salt is Na$_2$SO$_4$, K$_2$SO$_4$, (NH$_4$)$_2$SO$_4$, Na$_2$CO$_3$, or K$_2$CO$_3$ under conditions of high shear mixing to an average salt concentration of about 7–14 percent by weight and a final salt concentration of at least about 4 percent at ambient temperature to about 80° C. to precipitate the major portion of the polyvinyl alcohol as a material containing less than twenty percent by weight of agglomerated salt and separating said precipitated polyvinyl alcohol from the mixture.

2. The process of claim 1 wherein the treated stream is subjected to electrodialysis after separation of the precipitated polymeric size, thereby producing a brine low in organic impurities and enriched in salt content and a solution low in salt content and high in organic impurities.

3. The process of claim 2 wherein the salt is Na$_2$SO$_4$.

4. The process of claim 3 wherein the size precipitation step is carried out at about 50° C.–75° C. with an average Na$_2$SO$_4$ concentration of about 9–12 percent.

5. The process of claim 1 wherein the high shear mixing is provided by at least one agitator operating at a speed of at least about 1000 r.p.m.

* * * * *